United States Patent [19]
Horning et al.

[11] Patent Number: 5,619,737
[45] Date of Patent: Apr. 8, 1997

[54] ENCODEMENT-ON-FILM RECORDING APPARATUS UTILIZES FLASH COMPONENTS IN A CAMERA

[75] Inventors: Randy E. Horning; Douglas W. Constable; David C. Smart, all of Rochester, N.Y.

[73] Assignee: Eastman Kodak Company, Rochester, N.Y.

[21] Appl. No.: 594,881

[22] Filed: Feb. 7, 1996

[51] Int. Cl.$^6$ .......................... G03B 13/10; G03B 15/03; G03B 17/24
[52] U.S. Cl. .......................... 396/195; 396/315; 396/378
[58] Field of Search .................................... 354/106, 129, 354/147, 149.11, 219, 222; 396/176, 180, 195, 315, 373, 378

[56] References Cited

U.S. PATENT DOCUMENTS

| | | | |
|---|---|---|---|
| 4,181,416 | 1/1980 | Ohtaki et al. | 354/106 |
| 4,583,831 | 4/1986 | Harvey | 354/106 |
| 5,021,815 | 6/1991 | Harvey | 354/222 |
| 5,059,993 | 10/1991 | Harvey | 354/222 |
| 5,132,715 | 7/1992 | Taillie | 354/105 |
| 5,151,726 | 9/1992 | Iwashita et al. | 354/75 |
| 5,204,707 | 4/1993 | Harvey | 354/75 |

*Primary Examiner*—Safet Metjahic
*Assistant Examiner*—J. K. Han
*Attorney, Agent, or Firm*—Roger A. Fields

[57] ABSTRACT

A camera assembly comprises a plurality of encodement-on-film recording means adapted to receive electrical energy to provide various film encodements, an encodement-on-film selector movable to various selection positions to select one or more of the recording means to provide the film encodements, a flash charge storage capacitor, and a shutter-flash synch contact connected to the flash capacitor to enable the flash capacitor to supply electrical energy when a shutter blade impacts the synch contact. Respective ones of the recording means are coupled via the synch contact to the flash capacitor to receive electrical energy from the flash capacitor. The synch contact supports the selector for movement to its selection positions and is coupled to the selector to permit the selector to select one or more of the recording means to receive electrical energy from the flash capacitor. This arrangement provides a savings of parts desirable in a low cost camera.

5 Claims, 8 Drawing Sheets

5,619,737

ENCODEMENT-ON-FILM RECORDING APPARATUS UTILIZES FLASH COMPONENTS IN A CAMERA

CROSS-REFERENCE TO RELATED APPLICATION

Reference is made to commonly assigned copending application Ser. No. 08/610,645, entitled OPTICAL DATA RECORDING CIRCUIT FOR A PHOTOGRAPHIC CAMERA and filed Jul. 31, 1995 in the name of Douglas W. Constable.

The cross-referenced application is incorporated in this application.

FIELD OF THE INVENTION

The invention relates generally to the field of photography, and in particular to encodement-on-film recording apparatus in cameras.

BACKGROUND OF THE INVENTION

Cameras have been proposed, such as disclosed in prior art U.S. Pat. No. 4,583,831, issued Apr. 22, 1986, that include means for taking pictures which when printed are intended to have aspect ratios different than the aspect ratios of the negatives. Each aspect ratio for a print is selected by the photographer before he or she takes the picture. One currently popular aspect ratio for prints, in addition to the normal or full frame one, i.e. 1.5:1, is between 2:1 and 3:1. An aspect ratio between 2:1 and 3:1 provides a panoramic or stretch format print as compared to the normal format print having an aspect ratio of 1.5:1.

Since it is necessary for the photographer to know how much of the subject will be included in the print, the viewfinder in these cameras typically will have some masking device, such as a masking blade, for partially masking the field of view of the viewfinder to change the aspect ratio of the field of view to the aspect ratio selected by the photographer.

Also, to enable a print to be made having the aspect ratio selected by the photographer, an optical or magnetic film encodement identifying the selected ratio is recorded for each picture. During photofinishing the encodement is read from within or adjacent the negative to make the print with the selected ratio.

The Cross-Referenced Application

Cross-referenced application Ser. No. 08/610,045, which is incorporated in this application, suggests that in low cost cameras, including one or more light-emitting diodes to provide an optical film encodement identifying the aspect ratio selected by the photographer for the print, the electrical charge for powering the light-emitting diodes be supplied by a flash charge storage capacitor instead of by a battery in the camera.

SUMMARY OF THE INVENTION

According to the invention a camera assembly comprising a plurality of encodement-on-film recording means adapted to receive electrical energy to provide various film encodements, an encodement-on-film selector movable to various selection positions to select one or more of the recording means to provide the film encodements, a flash charge storage capacitor, and a shutter-flash synch contact connected to the flash capacitor to enable the flash capacitor to supply electrical energy when a shutter blade impacts the synch contact, is characterized in that:

respective ones of the recording means are coupled via the synch contact to the flash capacitor to receive electrical energy from the flash capacitor; and the synch contact supports the selector for movement to its selection positions and is coupled to the selector to permit the selector to select one or more of the recording means to receive electrical energy from the flash capacitor.

This arrangement provides a savings of parts desirable in a low cost camera.

DETAILED DESCRIPTION OF THE INVENTION

The invention is disclosed as being embodied preferably in an electronic flash camera. Because the features of such a camera are generally known, the description which follows is directed in particular only to those elements forming part of or cooperating directly with the disclosed embodiment. It is to be understood, however, that other elements may take various forms known to a person of ordinary skill in the art.

Figure 1:
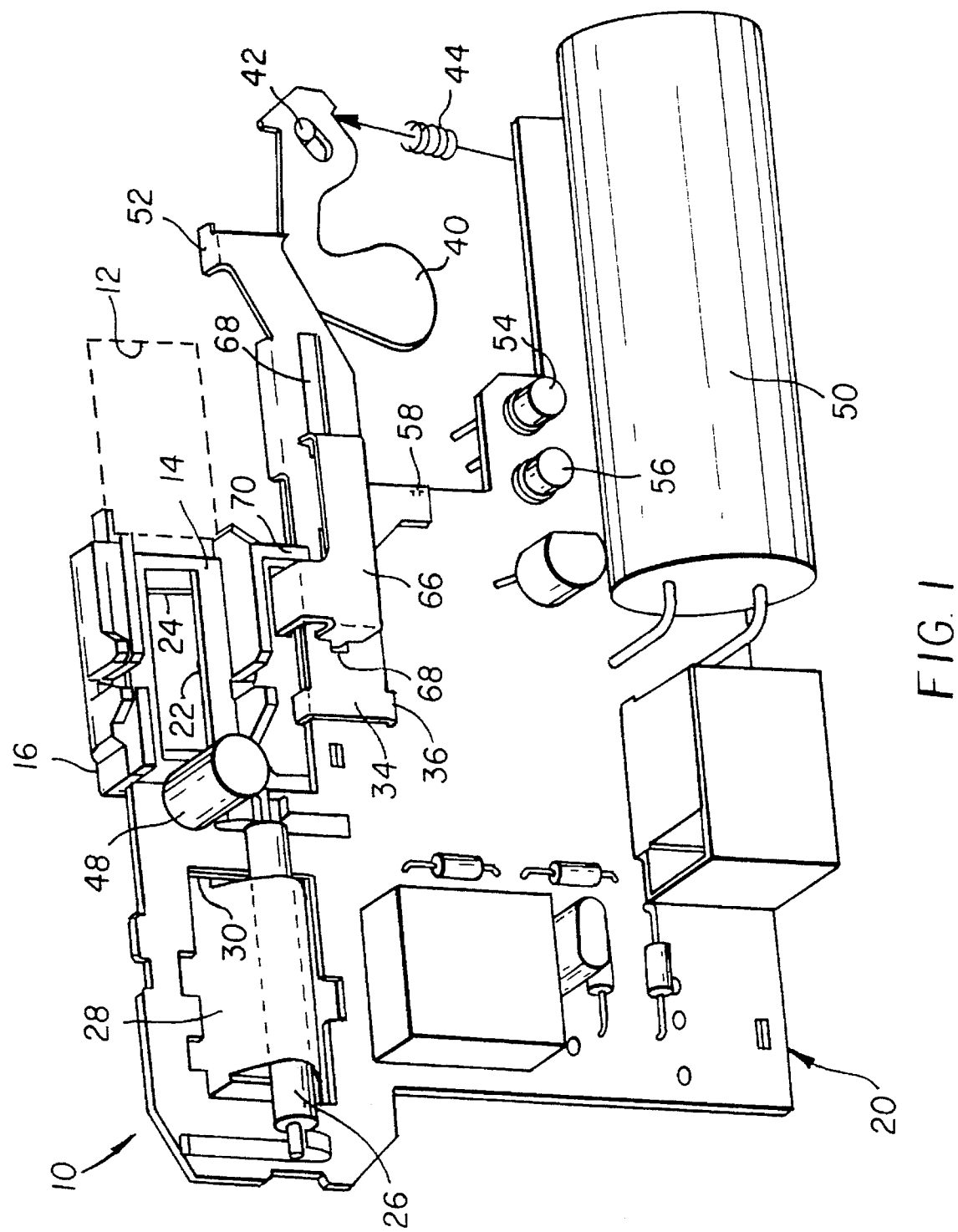
FIG. 1 is a rear perspective view of a camera assembly according to a preferred embodiment of the invention, showing the camera assembly in an HDTV (for high definition television) aspect ratio mode.
Figure 2:
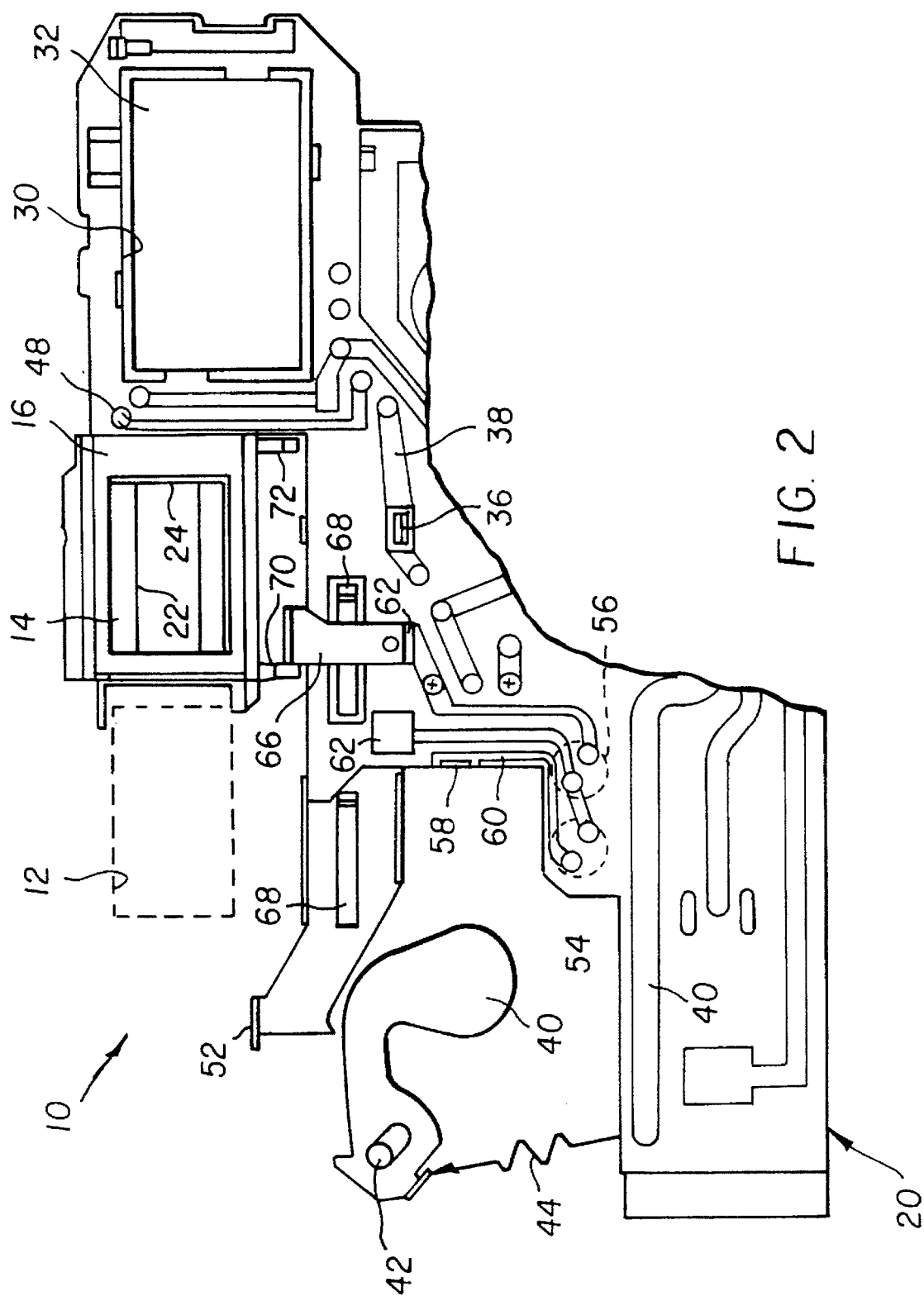
FIG. 2 is a front elevation view of the camera assembly as seen in FIG. 1.
Figure 3:
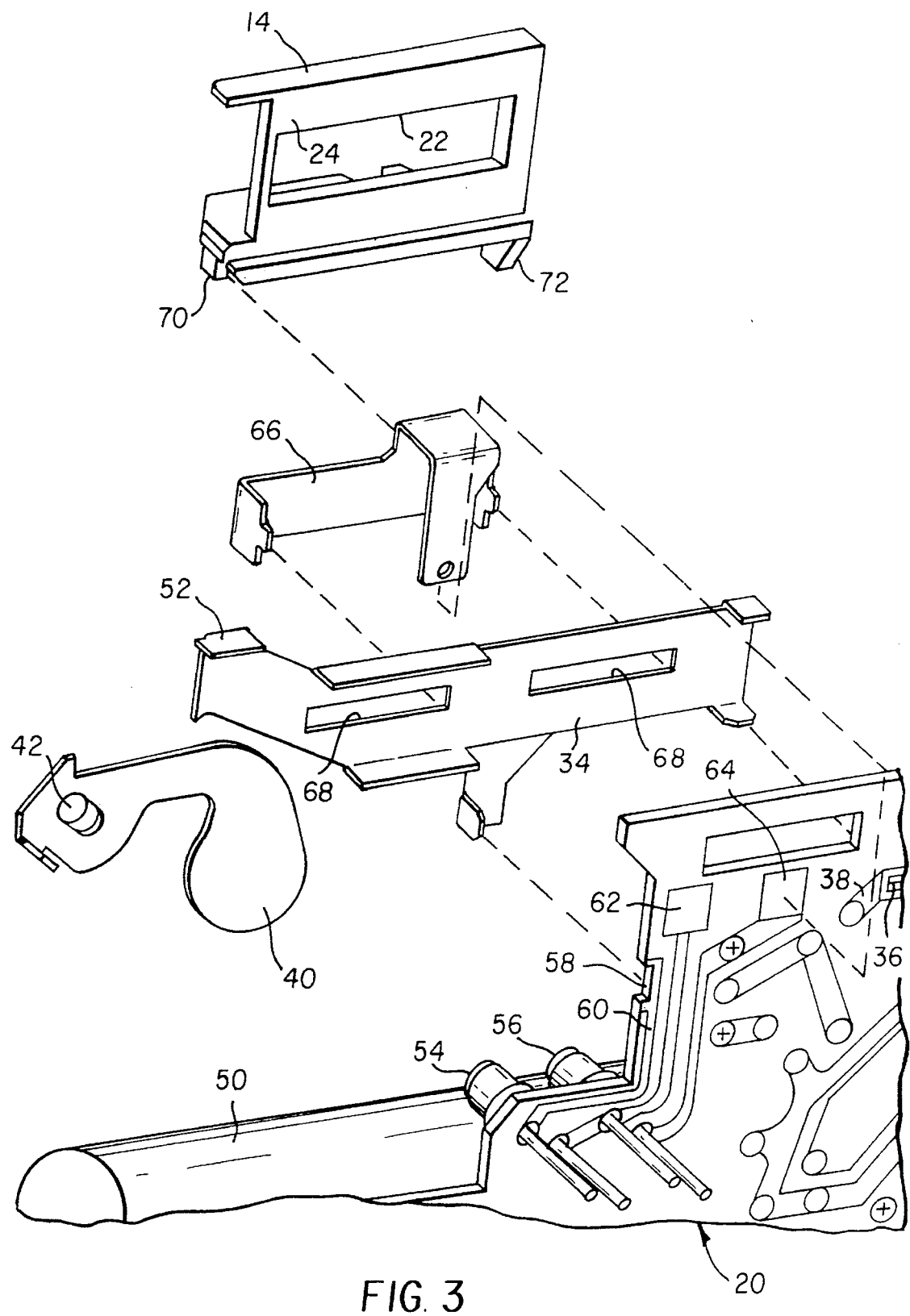
FIG. 3 is front exploded perspective view of a portion of the camera assembly as seen in FIG. 2.

Referring now to the drawings, FIGS. 1–3 depict a camera assembly 10 comprising a viewfinder field of view 12 shown schematically in broken line, a P(for panoramic)-masking blade 14, an N (for normal)-masking blade 16, and a flash/LED (for light-emitting diode) circuit board 20.

Figure 4:
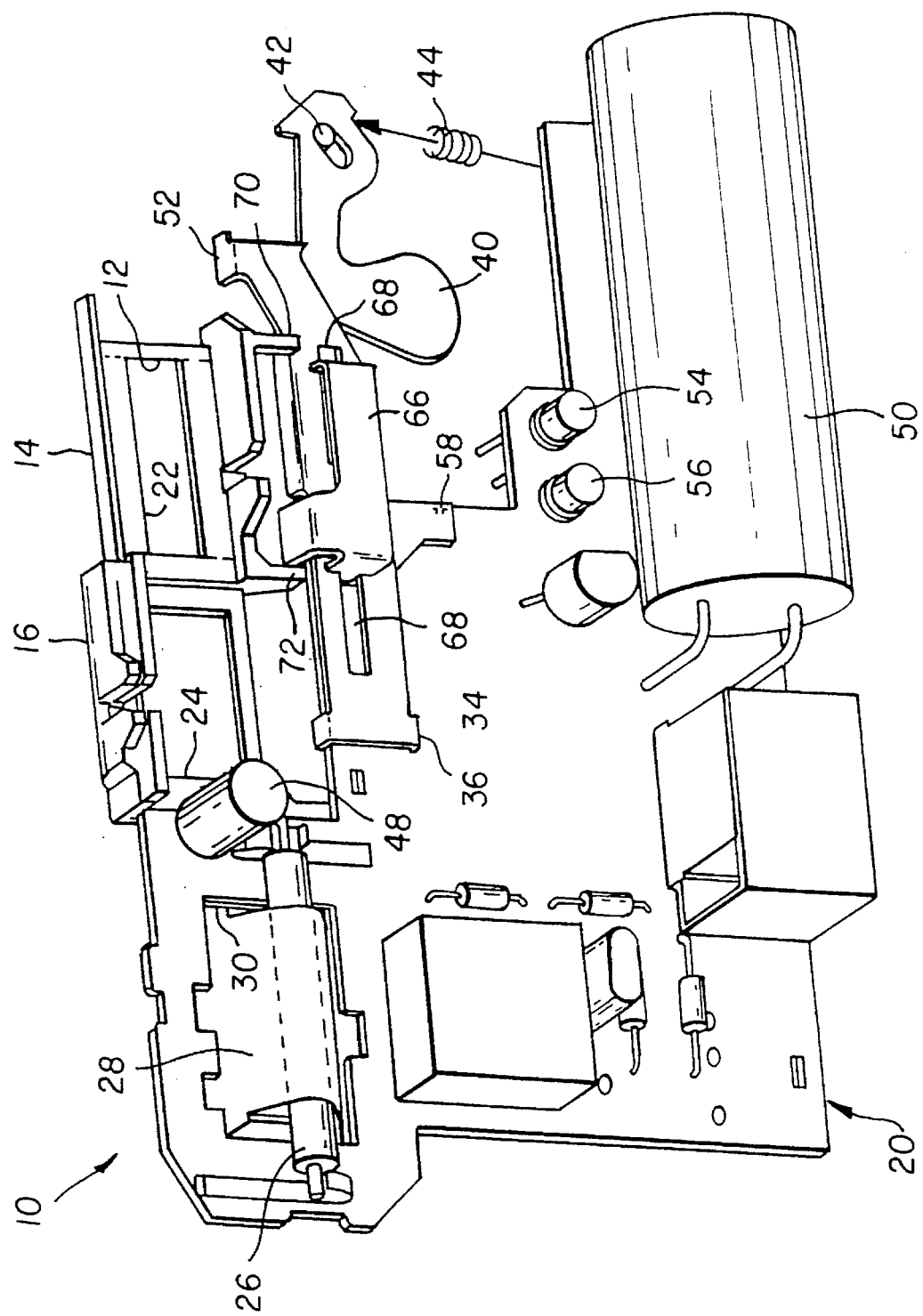
FIG. 4 is a rear perspective view of the camera assembly, showing the camera assembly in a panoramic aspect ratio mode.
Figure 5:
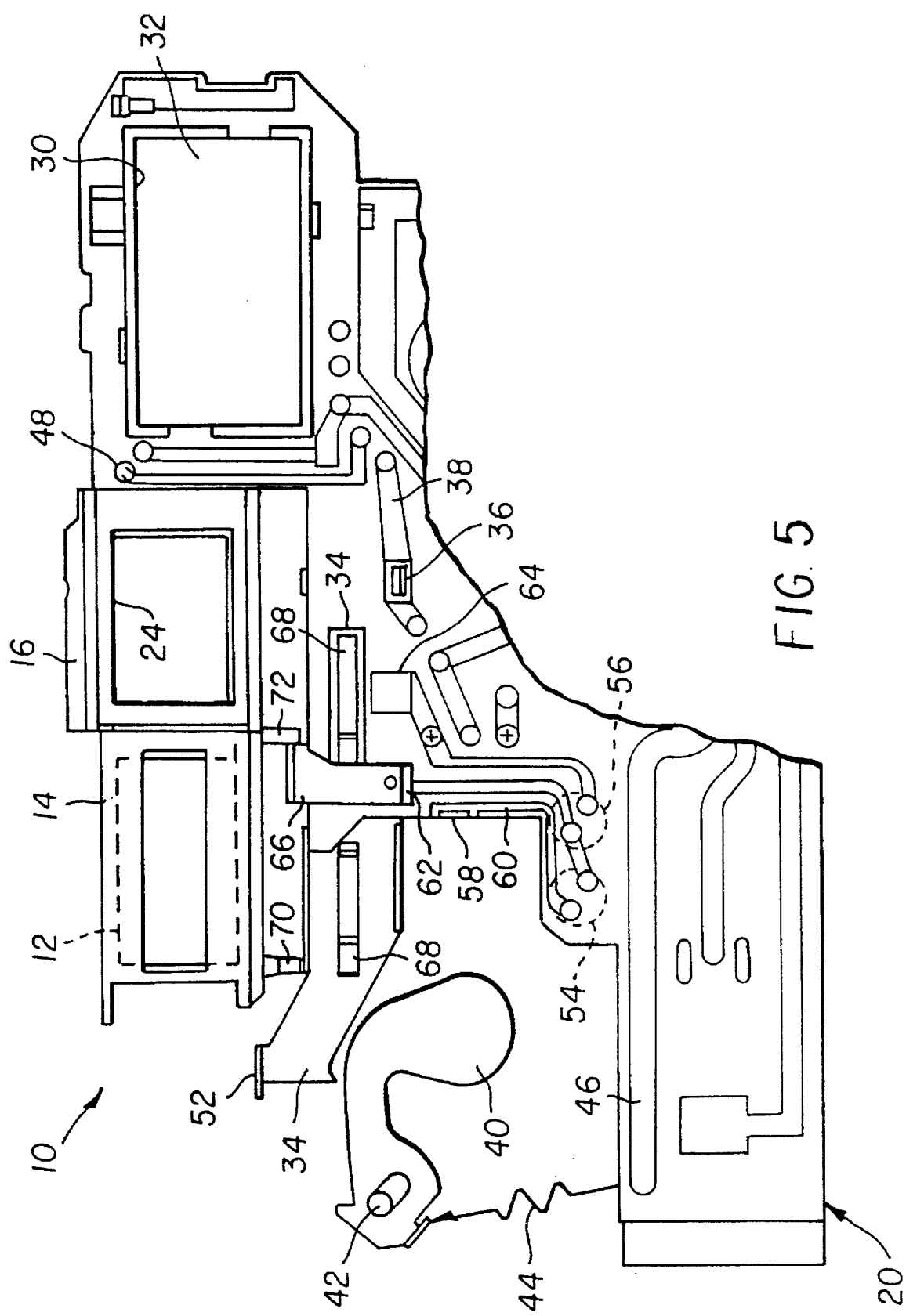
FIG. 5 is a front elevation view of the camera assembly as seen in FIG. 4.
Figure 6:
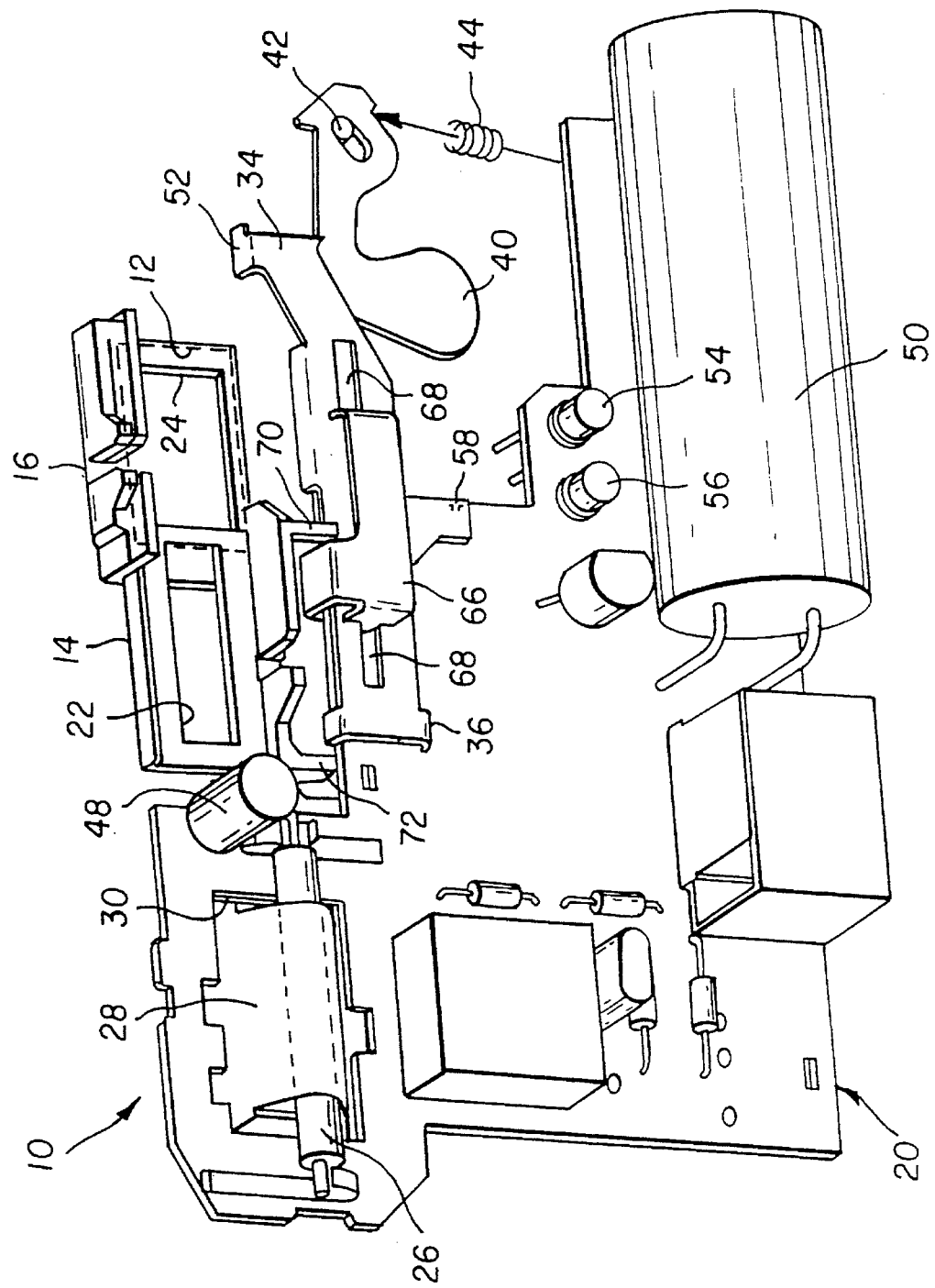
FIG. 6 is a rear perspective view of the camera assembly, showing the camera assembly in a normal aspect ratio mode.
Figure 7:
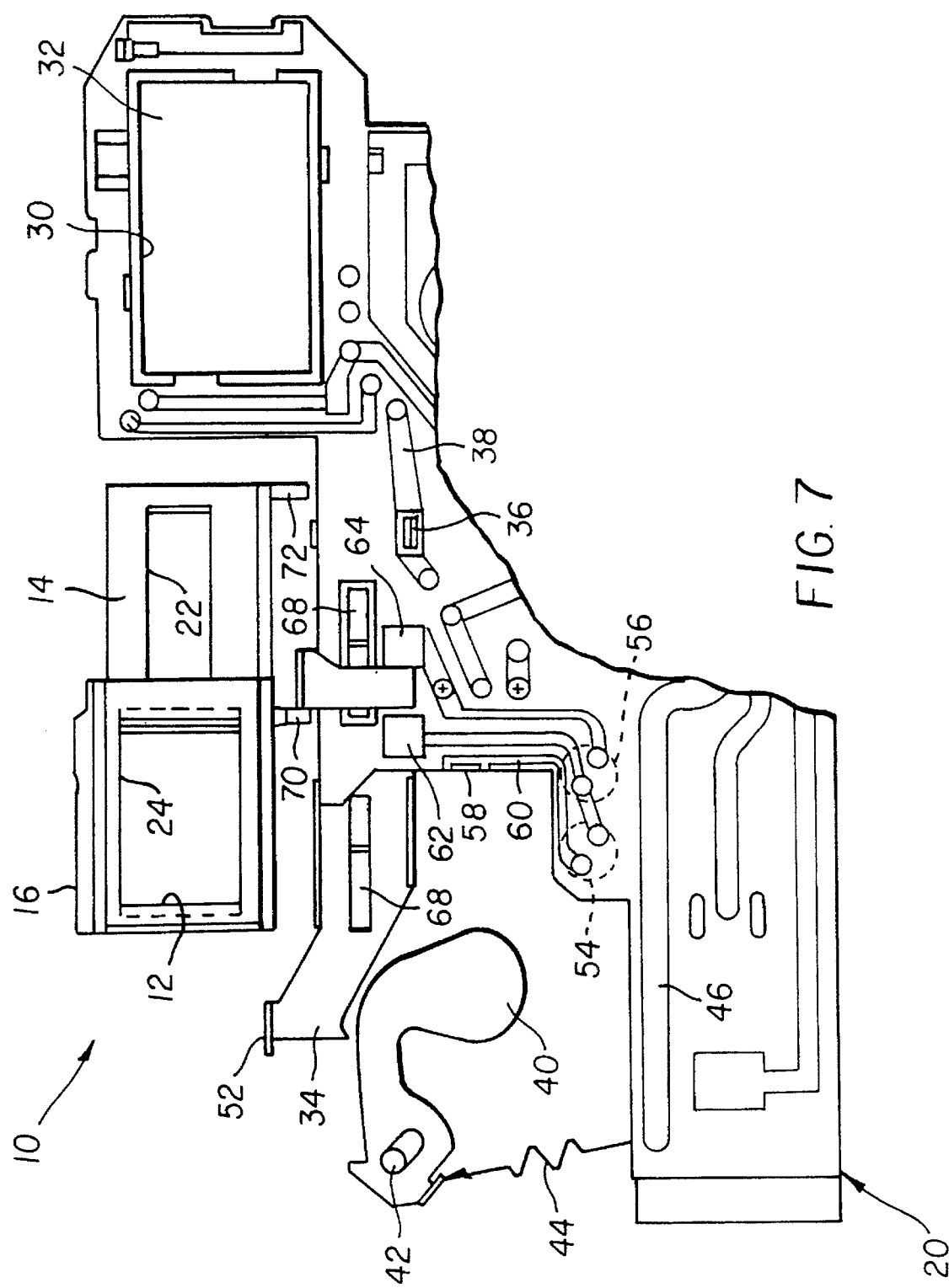
FIG. 7 is a front elevation view of the camera assembly as seen in FIG. 6.

The viewfinder field of view 12 has an HDTV (for high definition television) aspect ratio, which is 1.78:1. The P-masking blade 14 has an opening 22 that defines a panoramic or stretch aspect ratio, which is 2.85:1. The N-masking blade 16 has an opening 24 that defines a normal aspect ratio, which is 1.5:1. The two masking blades 14 and 16 are supported for transitional parallel movement to separately position each one of the masking blades in the viewfinder field of view 12, to change the aspect ratio of the viewfinder field of view to the particular aspect ratio of the masking blade in the field of view. FIGS. 1 and 2 show the two masking blades 14 and 16 superposed in storage, removed from the viewfinder field of view 12, to permit a view of the subject (to be photographed) in the viewfinder field of view which has the HDTV aspect ratio. FIGS. 4 and 5 show the N-masking blade 16 in storage removed from the viewfinder field of view 12 and the P-masking blade 14 in the viewfinder field of view, to permit a view of the subject in the viewfinder field of view which has the panoramic aspect ratio. FIGS. 6 and 7 show the P-masking blade 14 for the most part in storage and slightly in the viewfinder field of view 12 and the N-masking blade 16 in the viewfinder field of view and covering the small portion of the P-masking blade in the viewfinder field of view, to permit a view of the subject in the viewfinder field of view which has the normal aspect ratio.

The Flash/LED circuit board 20 has a flash and LED circuitry similar to the flash and LED circuitry disclosed in the cross-referenced application, which is incorporated in this application. Looking at FIGS. 1–3, there is shown an electronic flash tube 26 in the circuitry and a parabolic or elliptical flash reflector 28 mounted at the rear of a hole 30 in the circuit board 20, and a flash cover lens 32 mounted over the front of the hole in the circuit board. A shutter-flash synch contact 34 in the circuitry is mounted primarily on the rear of the circuit board 20 and is coupled at a solder connection 36 to a copper trace or run 38 on the front of the circuit board. A shutter blade 40 in the circuitry is supported on a fixed pin 42 for pivotal opening and closing movement and is biased closed by a return spring 44 in the circuitry which interconnects the shutter blade and a copper trace 46 on the front of the circuit board 20. A flash-ready light 48 in the circuitry is mounted on front of the circuit board 20 to inform the photographer when a flash storage charge capacitor 50 in the circuitry is sufficiently charged (voltage) to provide a flash exposure. The flash capacitor 50 is mounted on rear of the circuit board 20. When the shutter blade 40 is fully opened to make an exposure, it impacts against a stop tang 52 of the synch contact 34 to complete closure of the circuitry similar to closing a normally open switch. Consequently, the capacitor 50 discharges the flash tube 26 to produce the desired flash illumination. Closure of the circuitry is momentary, for example 100 milliseconds, because the return spring 44 quickly reverse-closes the shutter blade 40 to terminate the exposure.

Figure 8:
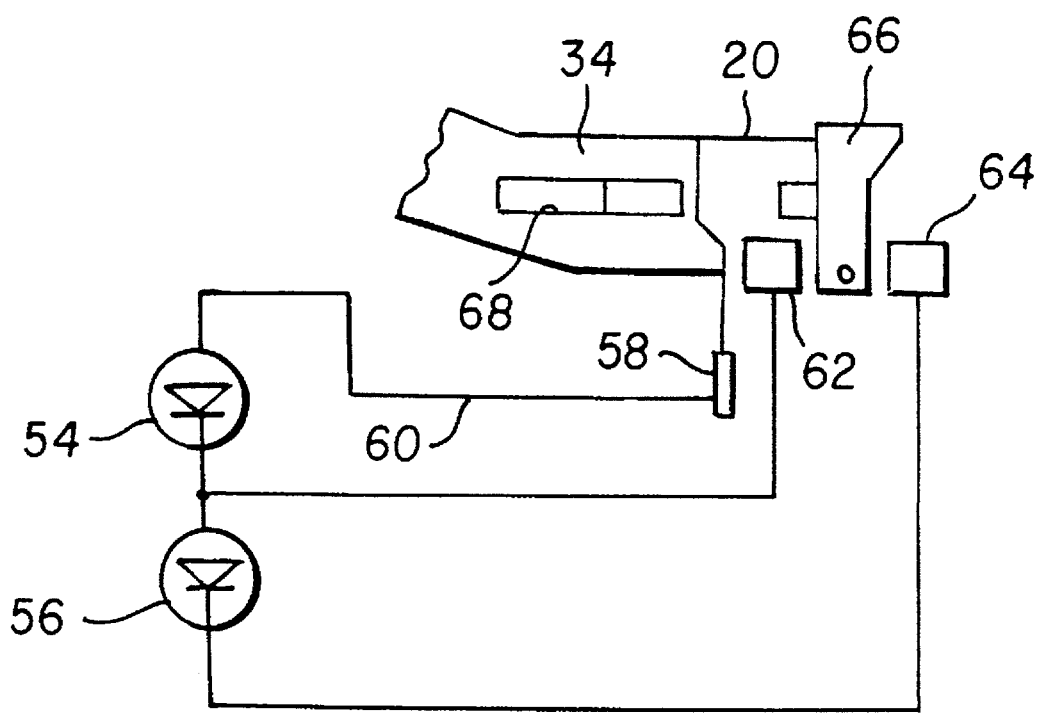
FIG. 8 is circuit diagram.

A pair of series-connected, print aspect ratio encodement-on-film recording LEDS 54 and 56 in the circuitry have respective light-emitting heads which protrude from the rear of the circuit board 20. See FIGS. 1–3 and 8. The series-connected LEDS 54 and 56 are arranged in the circuitry to possibly receive electrical energy (current) from the capacitor 50 when the shutter blade 40 is impacted against the stop tang 52 of the synch contact 34 to complete closure of the circuitry. The synch contact 34 is coupled at a solder connection 58 to a copper trace 60 on the front of the circuit board, which makes the solder connection common in the circuitry to the series-connected LEDS 54 and 56 as shown in FIG. 8. A pair of separate P- and H-contacts 62 and 64 in the circuitry are mounted on the front of the circuit board 20 to be located across the series-connected LEDS 54 and 56 to selectively shunt one, both or neither of the LEDS. The selective shunting is effected by a metal selector slide 66 which is supported within two identical aligned slots 68, 68 in the synch contact 34 for movement in opposite directions to any one of three selection or encodement positions. FIGS. 1 and 2 show the selector slide 66 in an H-selection position, in which the selector slide is located on the H-contact 64 to shunt both of the LEDS 54 and 56. Thus, neither of the LEDS 54 and 56 can receive electrical energy from the capacitor 50 when the shutter blade 40 is impacted against the stop tang 52 of the synch contact 34 to complete closure of the circuitry. FIGS. 4 and 5 show the selector slide 66 in an P-selection position, in which the selector slide is located on the P-contact 62 to shunt only the LED 54. Thus, only the LED 56 can receive electrical energy from the capacitor 50 when the shutter blade 40 is impacted against the stop tang 52 of the synch contact 34 to complete closure of the circuitry. FIGS. 6 and 7 show the selector slide 66 in an N-selection position, in which the selector slide is located midway between the P- and H-contacts 62 and 64 to shunt neither of the LEDS 54 and 56. Thus, both of the LEDS 54 and 56 can receive electrical energy from the capacitor 50 when the shutter blade 40 is impacted against the stop tang 52 of the synch contact 34 to complete closure of the circuitry.

Depending on whether one, both or neither of the series-connected LEDS 54 and 56 are shunted—one, both or neither of the two LEDS will receive electrical energy (current) from the capacitor 50 when the shutter blade 40 is impacted against the stop tang 52 of the synch contact 34 to complete closure of the circuitry—and respective P- H- or N-film encodements will result in the binary forms 0,1 0,0 and 1,1. Since the shutter blade 40 only abuts the stop tang 52 for a brief instant, electrical energy the capacitor 50 supplies to one, both or neither of the two LEDS 54 and 56 is negligible and does not diminish the flash illumination. Moreover, after the flash illumination there is sufficient residual charge (voltage) in the capacitor 50 to continue to provide the required energy (current) to one or both of the two LEDS 54 and 56. Once the capacitor 50 is drained of its residual charge, a re-charging switch, not shown, must be closed re-charge the capacitor.

When the P- and L-masking blades 14 and 16 are superposed in storage as shown in FIGS. 1 and 2, to permit a view of the subject (to be photographed) in the viewfinder field of view 12 which has the HDTV aspect ratio, a protuberance 70 of the P-masking blade holds the selector slide 66 in its H-selection position on the H-contact 64 to shunt both of the LEDS 54 and 56. When the P-masking blade 14 is moved out of storage into the viewfinder field of view 12 as shown in FIGS. 4 and 5, to permit a view of the subject in the viewfinder field of view which has the panoramic aspect ratio, a protuberance 72 of the P-masking blade moves the selector slide 66 from its H-selection position on the H-contact 64 to its P-selection position on the P-contact 62 to only shunt the LED 54. When the P-masking blade 14 is moved for the most part to storage, but remains slightly in the viewfinder field of view 12, and the N-masking blade 16 is moved from storage into the viewfinder field of view as shown in FIGS. 6 and 7, to permit a view of the subject in the viewfinder field of view which has the normal aspect ratio, the protuberance 70 of the P-masking blade moves the selector slide 66 from its P-position on the P-contact 62 to its N-position midway between the P-contact and the H-contact 64 to shunt neither of the LEDS 54 and 56.

Accordingly, when the viewfinder field of view 12 is reduced to the normal aspect ratio due to the presence of the N-masking blade 16 in the field of view, neither of the P- and H- contacts 62 and 64 are made use of for shunting the LEDS 54 and 56. See FIGS. 6 and 7. Thus both of the LEDS 54 and 56 can be energized to provide a N-film encodement of 1,1 in binary form. When the viewfinder field of view 12 has the HDTV aspect ratio because neither of the P- and N-masking blades 14 and 16 are present in the field of view, the H-contact 64 is made use of for shunting both of the LEDS 54 and 56. See FIGS. 1 and 2. Thus neither of the LEDS 54 and 56 can be energized, leaving a H-film encodement of 0,0 in binary form. When the viewfinder field of view 12 is reduced to the panoramic aspect ratio due to the presence of the P-masking blade 14 in the field of view, the P-contact is made use of for shunting only the LED 54. See FIGS. 4 and 5. Thus the LED 54 is not energized and the LED 56 is energized to provide a P-film encodement of 0,1 in binary form.

The invention has been described with reference to a preferred embodiment. However, it will be appreciated that variations and modifications can be effected by a person of ordinary skill in the art without departing from the scope of the invention. For example, instead of providing N- P- or H- film encodements, other film encodements for various print features can be provided. Also, instead of using the two LEDS 54 and 56, a pair of magnetic heads or other recording means may be used in their place.

PARTS LIST

10. camera assembly
12. viewfinder field of view
14. P-masking blade
16. N-masking blade
20. circuit board
22. blade opening
24. blade opening
26. flash tube
28. flash reflector
30. board hole
32. flash cover lens
34. shutter-flash synch contact
36. solder connection
38. copper trace
40. shutter blade
42. pin
44. return spring
46. copper trace
48. flash-ready light
50. capacitor
52. stop tang
54. LED
56. LED
58. solder connection
60. copper trace
62. P-contact
64. H-contact
66. selector slide
68. contact slots
70. masking blade protuberance
72. masking blade protuberance

We claim:

1. A camera assembly comprising flash circuitry firing means including a shutter-flash synch contact, encodement-on-film recording means for providing a film encodement, and a selector movable to an encodement position to cause said recording means to provide the film encodement, is characterized in that:

said synch contact continuously supports said selector for movement to the encodement position.

2. A camera assembly as recited in claim 1, wherein said recording means is adapted to receive electrical energy to provide the film encodement, said flash firing means includes a flash charge storage capacitor electrically coupled to said synch contact, and said selector is electrically coupled to said synch contact to allow said flash capacitor to supply electrical energy to said recording means when the selector is moved to the encodement position.

3. A camera assembly comprising a plurality of encodement-on-film recording means adapted to receive electrical energy to provide various film encodements, an encodement-on-film selector movable to various selection positions to select one or more of said recording means to provide the film encodements, a flash charge storage capacitor, and a shutter-flash synch contact connected to said flash capacitor to enable the flash capacitor to supply electrical energy when a shutter blade impacts said synch contact, is characterized in that:

one or more of said recording means are electrically coupled via said synch contact to said flash capacitor to receive electrical energy from the flash capacitor; and said synch contact supports said selector for movement to its selection positions and is electrically coupled to the selector to permit the selector to select one or more of said recording means to receive electrical energy from said flash capacitor.

4. A camera assembly as recited in claim 3, wherein said recording means provides print aspect ratio encodements-on-film, a masking blade is movable along a defined path into and out of the field of view of a viewfinder to vary the aspect ratio of the field of view, and said selector is located in the defined path of said masking blade to allow the masking blade to move the selector to its selection positions.

5. A camera assembly as recited in claim 4, wherein said synch contact continuously supports said selector to be moved to out of one of its selection positions and towards another of its election positions only when said masking blade is moved substantially into or out of the field of view of said viewfinder.

* * * * *